(12) United States Patent
Thomas et al.

(10) Patent No.: US 6,360,864 B1
(45) Date of Patent: Mar. 26, 2002

(54) CLUTCH DIVIDER PLATE

(75) Inventors: Steven Gerald Thomas, Bloomfield Hills; Eli Avny, Ann Arbor, both of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/515,565

(22) Filed: Feb. 29, 2000

(51) Int. Cl.[7] .......................... F16D 13/72; F16D 16/64

(52) U.S. Cl. .............................. 192/107 R; 192/70.12; 192/113.34

(58) Field of Search .......................... 192/70.12, 70.14, 192/107 R, 107 C, 113.26, 113.3, 113.31, 113.34; 188/218 XL, 71.6, 264 A, 264 E

(56) References Cited

U.S. PATENT DOCUMENTS

| | | | | |
|---|---|---|---|---|
| 1,453,599 A | * | 5/1923 | Parker | 192/113.3 |
| 2,380,900 A | * | 7/1945 | Wellman | 192/107 C |
| 3,730,304 A | * | 5/1973 | Buyze | 188/218 XL |
| 5,934,435 A | * | 8/1999 | Bauer | 192/113.34 |

FOREIGN PATENT DOCUMENTS

| | | | | |
|---|---|---|---|---|
| GB | 2170871 | * | 8/1986 | 192/107 R |
| JP | 6-50353 | * | 2/1994 | 192/107 R |

* cited by examiner

Primary Examiner—Richard M. Lorence
(74) Attorney, Agent, or Firm—Ford Global Tech., Inc

(57) ABSTRACT

A clutch divider plate 10 having a pair of outer plates 12, 14 and a pair of inner rings or members 16, 18. Rings or members 16, 18 include several notches 40, 38 which allow cooling fluid or oil to pass through the plate 10, thereby cooling plate 10.

4 Claims, 5 Drawing Sheets

CLUTCH DIVIDER PLATE

FIELD OF THE INVENTION

This invention relates to a clutch divider plate and more particularly, to a clutch divider plate having internal channels or passages which provide for improved heat dissipation.

BACKGROUND OF THE INVENTION

Clutch assemblies are used in automotive vehicles and are typically and operatively used to bridge the difference in rotational speed between various moving shafts and/or components within a vehicle. One type of clutch assembly, known as a "friction clutch", is typically employed within an automotive vehicle and utilizes several friction plates or members which are selectively forced or pressed upon one or more divider plates in order to transfer or transmit torque across the clutch. The friction plates are typically and selectively forced or pressed upon the divider plates and then released (i.e., engaged and disengaged) by way of a hydraulic or mechanical actuator or assembly. While the friction and divider plates are effective to transmit torque and power, they suffer from some drawbacks.

For example and without limitation, the outer or frictional surfaces of the friction plates which pressingly engage the divider plates create and/or produce substantial amounts of heat when engaged with and/or against the divider plates. Particularly, when friction plates engage a divider plate for a relatively extended period of time (e.g., one or more seconds), the heat generated by and between the friction plates and the divider plate can result in damage to the clutch assembly and/or to transmission oil/fluid within the clutch assembly. Consequently, it is desirable to remove heat quickly and efficiently from a clutch assembly which has been engaged.

Prior art clutch assemblies leave almost exclusively relied upon oil or cooling fluid to flow and/or move through grooves present in the surface of the friction plates, thereby removing the generated heat. These types of grooves are typically small, and thus allow only a limited amount of transmission oil or cooling fluid to flow between the plates when the plates are engaged. Consequently, the friction and divider plates remain subject to excessive heat during times of clutch engagement. Furthermore, prior art clutch assemblies have typically consisted of substantially flat divider plates that have a limited surface area from which to dissipate heat. Hence, even when the friction and divider plates are not engaged, heat flow and especially convection heat flow from these plates is relatively limited.

Therefore, there is a need for a clutch divider plate which overcomes some if not all of the drawbacks of prior clutch divider plate assemblies.

SUMMARY OF THE INVENTION

It is a first object of the invention to provide a divider plate for a clutch assembly which overcomes at least some of the previously delineated drawbacks of prior divider plates.

It is a second object of the invention to provide a divider plate for a clutch assembly which includes a passage and/or conduit in which fluid may flow, thereby dissipating heat while the clutch assembly is in the engaged state.

It is a third object of the invention to provide a clutch divider plate which provides an increased surface area for dissipating heat.

According to a first aspect of the present invention, a divider plate is provided. The divider plate is adapted for use within a clutch assembly of the type having a first and second friction plate, and a cooling fluid. The divider plate includes a first portion which is selectively engaged by the first friction plate; a second portion which is selectively engaged by the second friction plate; and a third portion which is disposed between the first portion and the second portion, the third portion having at least one a passage for receiving at least a portion of the cooling fluid, thereby cooling the divider plate.

According to a second aspect of the present invention, a method for dissipating heat from a clutch assembly is provided. The clutch assembly is of the type having a divider plate with a first and second surface, a first and second friction plate which selectively engage the first and the second surface of the divider plate, and a cooling fluid. The method includes the steps of: forming a passage between the first and second surface of the divider plate, effective to receive the cooling fluid, thereby dissipating the heat.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
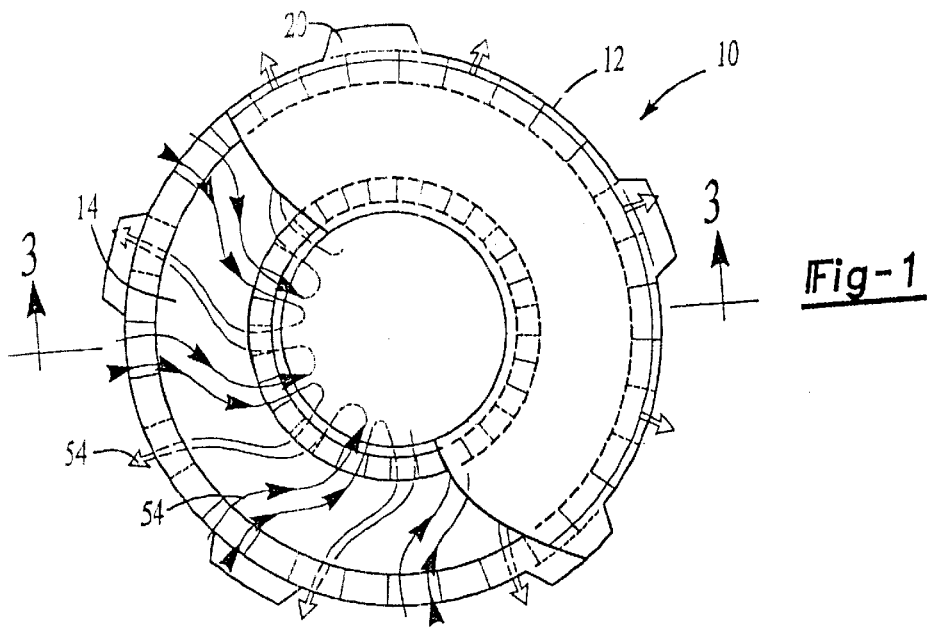
FIG. 1 in a front view of a clutch divider plate which is made in accordance with the teachings of the preferred embodiment of the invention and illustrating a portion of the front plate removed.
Figure 2:
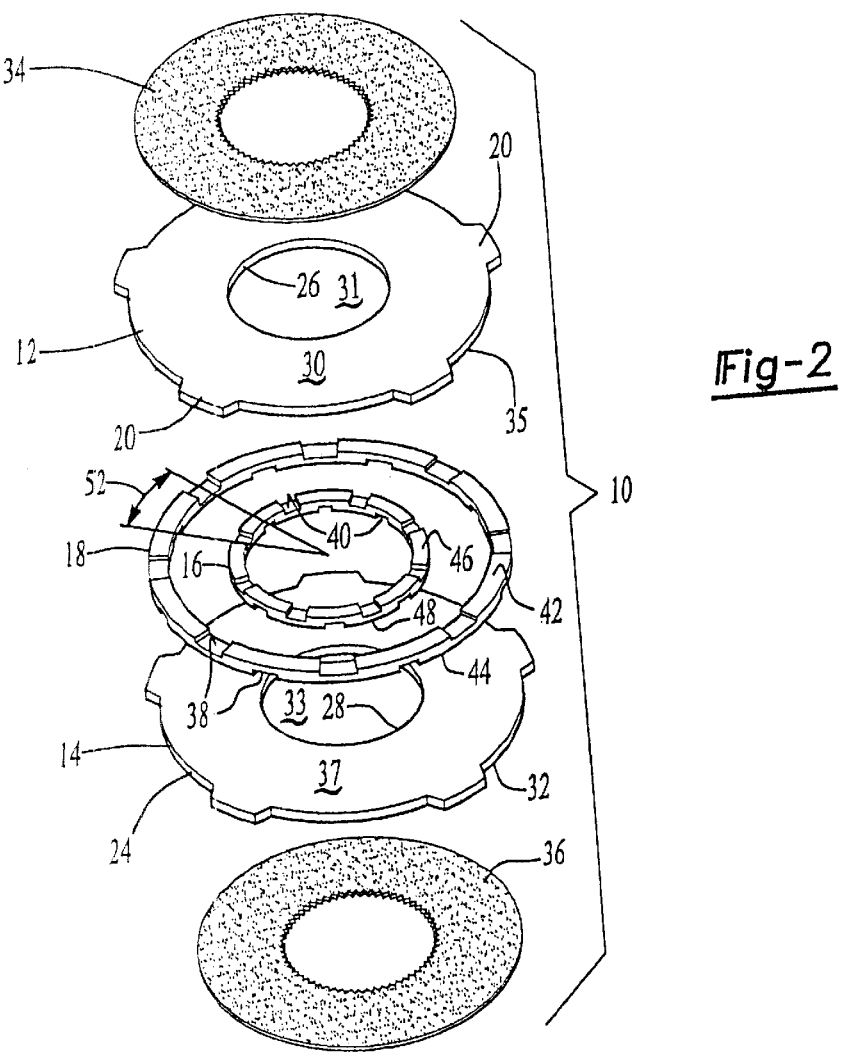
FIG. 2 is an exploded view of the clutch divider plate shown in FIG. 1.
Figure 3:
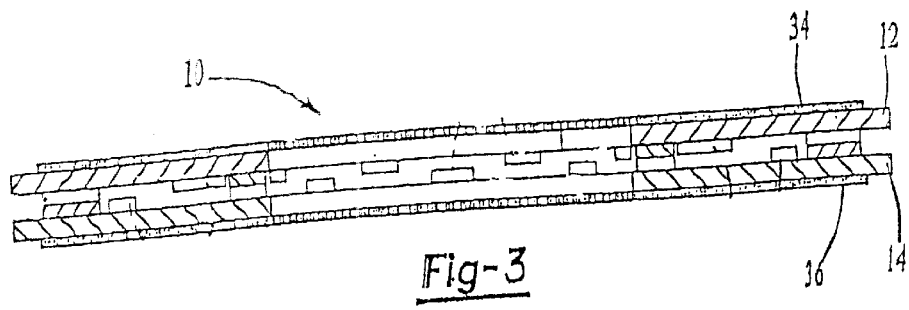
FIG. 3 is a sectional view of the clutch divider plate shown in FIG. 1 and taken along view line 3—3.

Referring now to FIGS. 1–3, there is shown a clutch divider plate, member, or assembly 10 which is made in accordance with the teachings of the preferred embodiment of the invention. Divider plate 10 is adapted for use in combination with a clutch assembly of the type having friction plates (e.g., plates 34, 36) which pressingly and frictionally engage the divider plate 10, thereby transferring torque across the clutch. Divider plate 10 includes a pair of substantially identical outer plates or members 12, 14 and a pair of notched rings 16, 18 which are disposed between plates 12 and 14.

Members 12, 14 are each generally ring-shaped and include several tabs, protrusions or notches 20 which are peripherally disposed around the outer perimeter or circumference 22, 24 of each member 12, 14, and which allow divider plate 10 to be attached to a portion of the clutch assembly in a known manner. Members 12, 14 respectively include a generally circular inner perimeter or circumference 26, 28.

Members 12, 14 further respectively include a pair of outer surfaces 30, 32 which are operatively engaged by friction plates 34, 36, and a pair of inner surfaces 35, 37. Members 12, 14 respectively include centrally disposed apertures 31, 33 which are substantially aligned or overlapping.

Rings 16 and 18 are each generally circular in shape and each respectively include several integrally formed notches or recessed portions 38, 40 which are respectively formed on the top surfaces 42, 46 and the bottom surfaces 44, 48 of rings 16 and 18. In the preferred embodiment, notches 38, 40 formed in the top surfaces 42, 46 of rings 16, 18 are respectively and radially "offset" from the notches 38, 40 formed in the bottom surfaces 44, 48 of rings 16, 18 by an angle 52. Additionally, the notches 38 which are formed on the top surface 42 of ring 18 are radially or angularly "offset" from the notches 40 which are formed on the top surface 46 of ring 16, and the notches 38 which are formed on the bottom surface 44 of ring 18 are radially or angularly "offset" from the notches 40 which are formed on the bottom surface 48 of ring 16. In one non-limiting embodiment, rings 18 and 16 are formed in a conventional manner from a powdered metal material.

Plates 12, 14 and rings 16, 18 are abuttingly and fixedly coupled together in a conventional manner, such as by a laser welding, brazing, bonding, sinter-brazing, stamping or staking technique or procedure. More particularly, inner surface 35 of member 12 is fixedly and abuttingly coupled to surfaces 42, 46 of rings 18, 16, and inner surface 37 of member 14 is fixedly and abuttingly coupled to surfaces 44, 48 of rings 18, 16. When assembled, notches 38, 40 provide passages for cooling fluid/oil to pass into and out of divider plate 10.

In operation, transmission oil and/or cooling fluid flowing through the clutch assembly passes through notches 38, 40 in the directions illustrated by arrows 54, thereby penetrating and traversing the substantially hollow divider plate 10. The "offset" configuration or arrangement of notches 38, 40 allows for maximum flow of oil/fluid through plates 12, 14, thereby increasing the rate that of heat is dissipated from divider plate 10 (e.g. by increasing the rate of heat convection) Since the center of plate 10 is substantially "hollow" or "open" this "cooling" or heat convection occurs at all times, regardless of whether the friction plates 34, 36 are engaging plate 10. Furthermore, because plate 10 is substantially "hollow", both surfaces of each member 12, 14 (e.g., surfaces 30, 35 and surfaces 32, 37) are exposed to cooling oil/fluid, thereby substantially increasing the overall "convective area" (i.e., the surface area which is exposed to cooling fluid) relative to prior divider plates.

Figure 4:
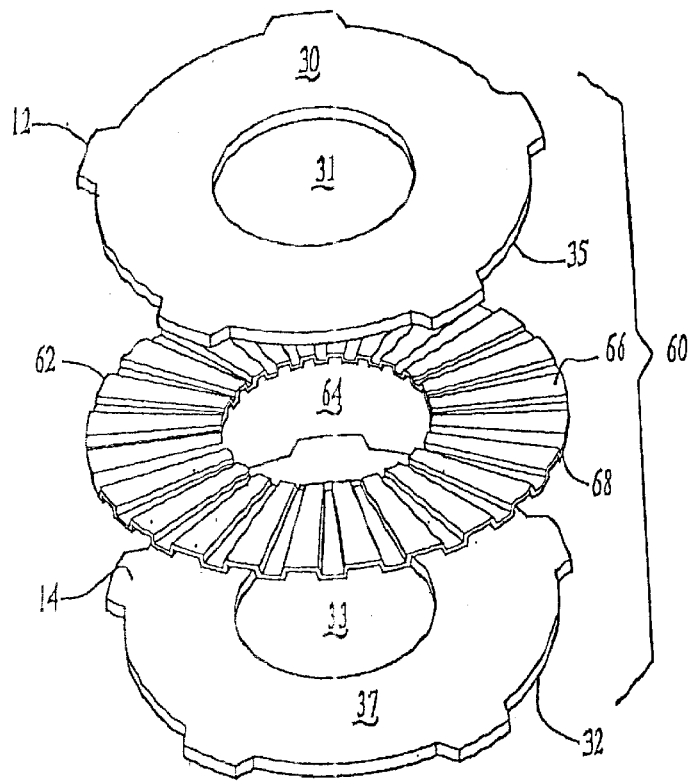
FIG. 4 is an exploded view of a clutch divider plate which is made in accordance with the teachings of a second embodiment of the invention.
Figure 5:
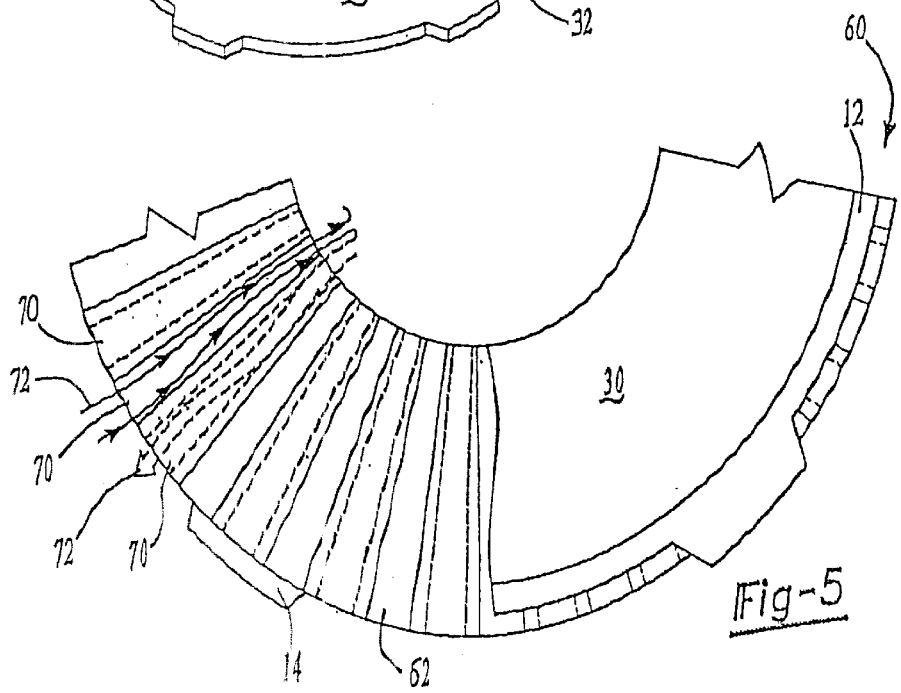
FIG. 5 is a partial view of the clutch divider plate shown in FIG. 4 with a portion of the front plate removed.

Referring now to FIGS. 4 and 5, there is shown a clutch divider plate 60 which is made in accordance with the teachings of a second embodiment of the present invention. Plate 60 is substantially similar to plate 10, except that the rings 16 and 18 have been replaced with corrugated member 62. With the exception of corrugated member 62, divider plate 60 includes substantially identical components as divider plate 10.

Corrugated member 62 is generally circular and includes a centrally disposed aperture 64 which is substantially aligned with apertures 31, 33. Member 62 includes opposing raised and recessed portions, corrugations, or surfaces 66, 68 which cooperatively form a plurality of passages 70 between members 12, 14. In the preferred embodiment of the invention, member 62 is stamped, punched or otherwise machined from a conventional sheet metal material.

Plates 12, 14 and member 62 are fixedly coupled together in a conventional manner, such as by laser welding, brazins, bonding, sinter-brazing, stamping or staking. More particularly, inner surface 35 of member 12 is fixedly coupled to surface 66 of member 62 (e.g., the "raised" portions of surface 66), and inner surface 37 of member 14 is fixedly coupled to surface 68 of member 62 (e.g., those portions of surface 68 closest to surface 37). When members 12, 14 and 62 are joined together, the "corrugations" of member 62 provide passages 70 for cooling fluid or oil to pass into and out of divider plate 60.

In operation, transmission oil and/or cooling fluid flowing through the clutch assembly passes through passages 70 in the directions illustrated by arrows 72, thereby penetrating and traversing the substantially hollow divider plate 60. Corrugated member 62 and passages 70 cooperate to provide a substantially increased "convective area" relative to prior divider plates. The length and formation of passages 70 and member 62 provides more convective surface area than plate 10, and therefore offers improved heat dissipating attributes or benefits.

Figure 6:
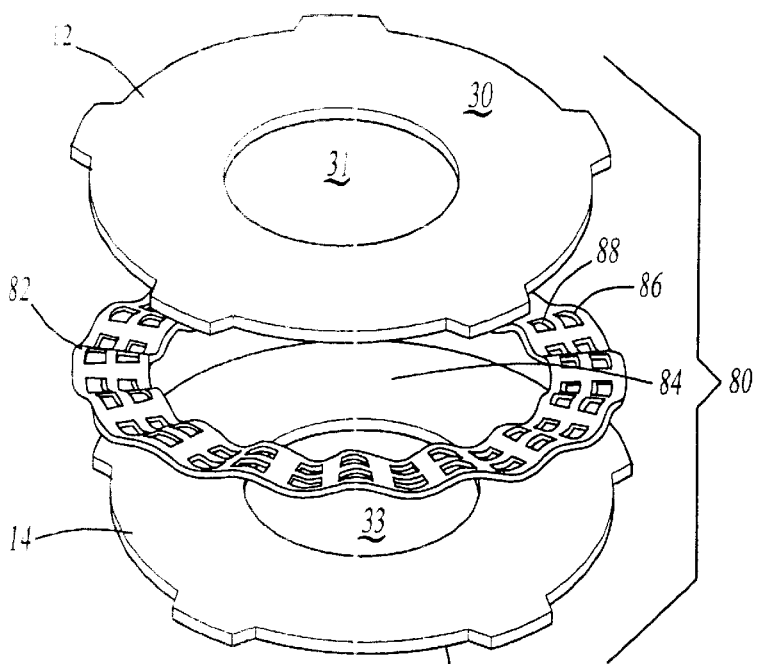
FIG. 6 is a an exploded view of a clutch divider plate which is made in accordance with the teachings of a third embodiment of the invention.
Figure 7:
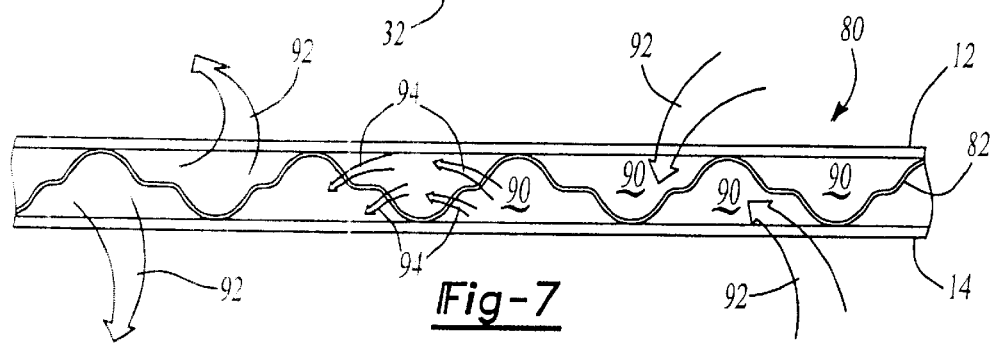
FIG. 7 is a side assembled view of the clutch divider plate shown in FIG. 6.

Ref erring now to FIGS. 6 and 7, there is shown a clutch divider plate 80 which is made in accordance with the teachings of a third embodiment of the present invention. Plate 80 is substantially similar to plate 60, except that corrugated member 62 has been replaced with a rippled member 82. With the exception of rippled member 82, divider plate 80 includes substantially identical components as divider plate 60.

Rippled member 82 is generally circular and includes a centrally disposed aperture 84 which is substantially aligned with apertures 31, 33. Member 82 includes an outer plurality, array or "ring" of apertures 86 and an inner plurality, array or "ring" of apertures 88. In the preferred embodiment of the invention, member 82 is stamped, punched or otherwise machined from a conventional sheet metal material.

Plates 12, 14 and member 82 are fixedly coupled together in a conventional manner (e.g., laser welding, brazing, bonding, sinter-brazing, stamping or staking). When plate 80 is assembled, member 82 is operatively and abuttingly disposed or "sandwiched" between inner surface 35 of member 12 and inner surface 37 of member 14. The "ripples" or "waves" of member 82 provide passages 90 for cooling fluid or oil to pass into and out of divider plate 80.

In operation, transmission oil and/or cooling fluid flowing through the clutch assembly passes through passages 90 in the directions illustrated by arrows 92, thereby penetrating and traversing the substantially hollow divider plate 80. Rippled member 62 and passages 90 cooperatively provide a substantially increased "convective area" relative to prior divider plates. Apertures 86 and 88 provide additional passages for fluid/oil to flow within plate 80 in the directions illustrated by arrows 94, thereby increasing the circulation of fluid/oil within plate 90 and providing improved heat dissipation and convection.

Figure 8:
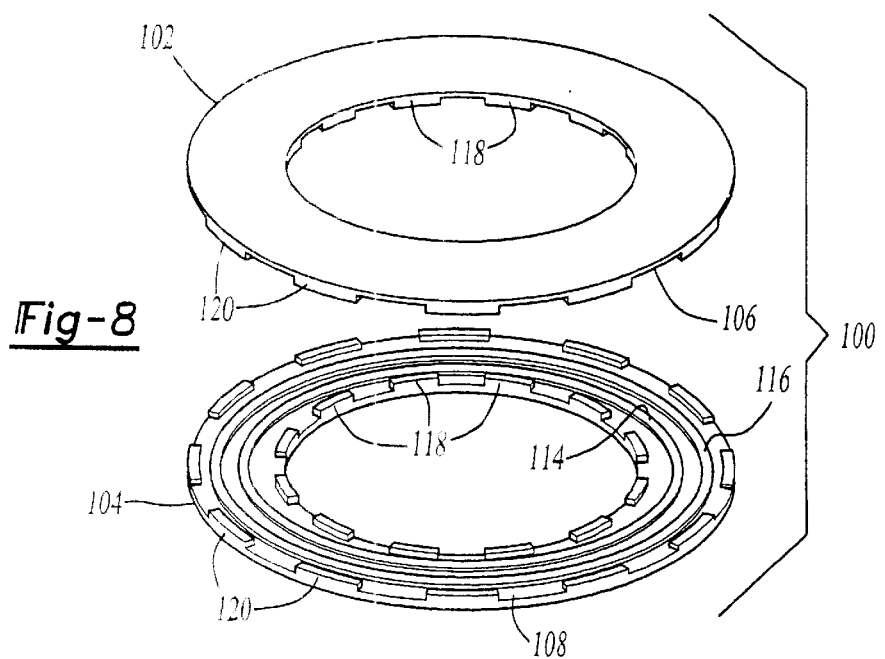
FIG. 8 is an exploded view of a clutch divider plate which is made in accordance with the teachings of a fourth embodiment of the invention.
Figure 9:
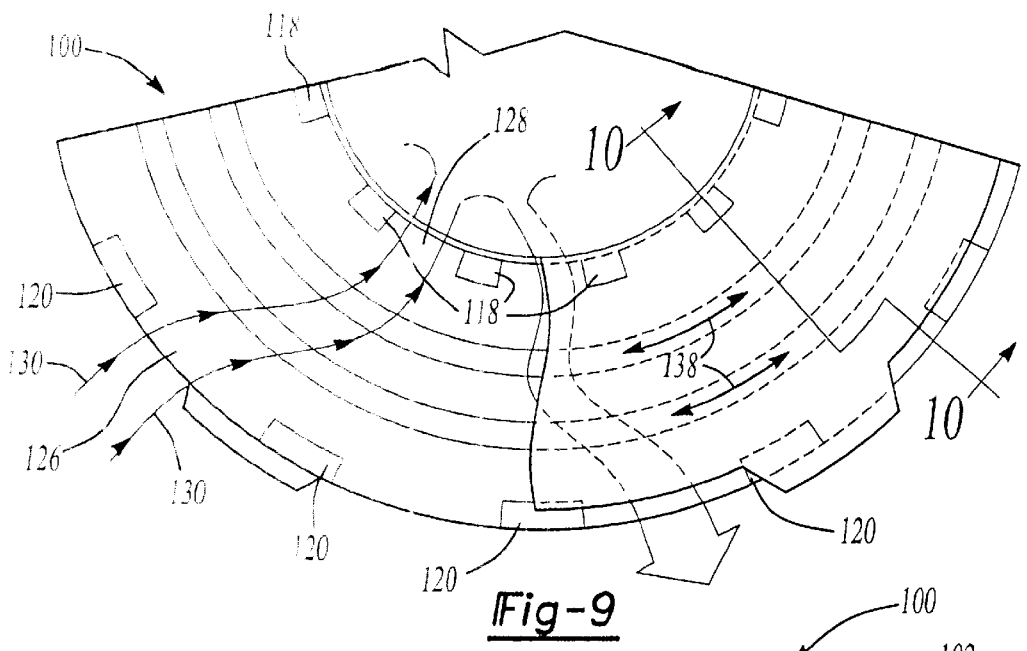
FIG. 9 is a partial assembled view of the clutch divider plate shown in FIG. 8 with a portion of the front plate removed.
Figure 10:
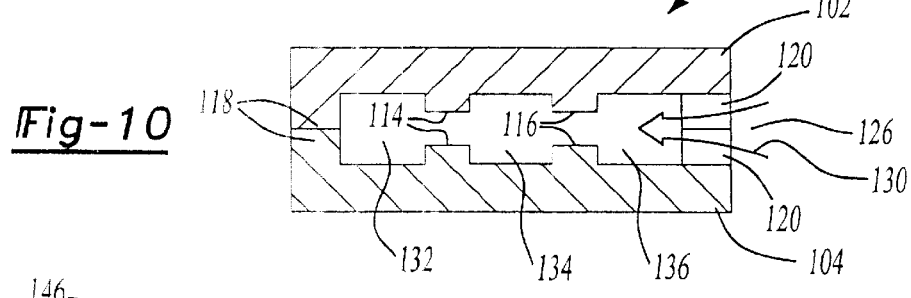
FIG. 10 is a sectional view of the clutch divider plate shown in FIG. 8 and taken along view line 10—10.

Referring now to FIGS. 8–10, there is shown a clutch divider plate 100 which is made in accordance with the teachings of a fourth embodiment of the present invention. Divider plate 100 includes a pair of substantially identical generally ring-shaped plates or members 102, 104. In the preferred embodiment, plates 102, 104 are formed in a conventional manner from a powdered metal material. Plates 102, 104 each respectively an inner surface or portion 106, 108.

Inner surfaces 106, 108 each include substantially identical integrally formed inner annular raised or "ribbed" portions 114 and outer annular raised or "ribbed" portions 116. Surfaces 106, 108 further Include an inner plurality or array of raised portions or "tabs" 118 which are disposed around the inner periphery of surfaces 106 and 108, and an outer plurality or array of raised portions or "tabs" 120 which are disposed around the outer periphery of surfaces 106 and 108.

When plate 100 is assembled, tabs 122 and 124 are aligned and members 102, 104 are coupled together in a conventional manner (e.g., welding, brazing, bonding). Tabs 122 and tabs 124 cooperate to form several inlet and outlet passages or channels 126, 128 which allow fluid/oil to flow inside and outside of divider plate 100 (e.g., in the directions illustrated by arrows 130). Furthermore, ribbed portions 114, 116 cooperatively form annular channels or passage 122, 134 and 136, in which oil or fluid may radially flow within plate 100 (e.g., in the directions illustrated by arrows 129). Ribbed parties 114, 116 further provide torsional strength and improve the rigidity of plate 100.

In operation, transmission oil and/or cooling fluid flowing through the clutch assembly travels through passages 126, 128 in the directions illustrated by arrows 130, thereby penetrating and traversing the divider plate 100. Substantially hollow plate 100 and passages 126, 128, 132, 134, and 136 cooperatively provide a substantially increased the "convective area" relative to prior divider plates. Furthermore, passages 132–136 channel or direct fluid or oil radially through plate 100 (e.g., in the directions illustrated by arrows 138), thereby increasing the circulation of fluid/ oil within plate 100 and providing improved heat dissipation.

Figure 11:
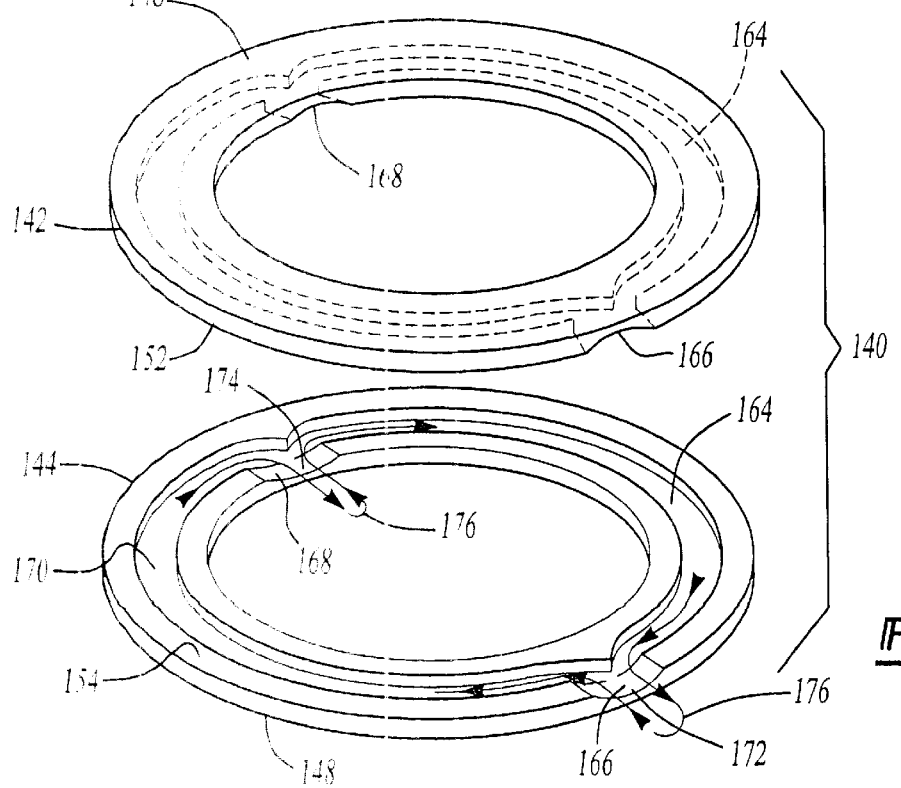
FIG. 11 is an exploded view of a clutch divider plate which is made in accordance with the teachings of a fifth embodiment of the invention.

Referring now to FIG. 11, there is shown a clutch divider plate 140 which is made in accordance with the teachings of a fifth embodiment of the present invention. Divider plate 140 includes a pair of substantially identical generally ring-shaped plates or members 142, 144. In the preferred embodiment, plates 142, 144 are formed in a conventional manner from a powdered metal material. Plates 142, 144 each respectively include a relatively smooth outer surface or portion 146, 148 which are selectively engaged by conventional friction plates during operation. Plates 142, 144 each further respectively include an inner surface or portion 150, 152.

Inner surfaces 150, 152 each include a substantially identical integrally formed annular groove or channel 164, an outer groove or recessed portion 166 which communicates with channel 164, and an inner groove or recessed portions 168 which communicates with channel 164.

When plate 150 is assembled, grooves 168 and 166 are respectively aligned as shown in FIG. 11, and members 152, 154 are coupled together in a conventional manner (e.g., welding, brazing, bonding). Crooves 144 cooperate to form an annular channel 170 within plate 140. Grooves 166 and grooves 168 respectively and cooperatively form inlet and outlet inlet and outlet passages or channels 172, 174 which allow fluid/oil to flow inside and outside of divider plate 140 (e.g., in the directions illustrated by arrows 176).

In operation, transmission oil and/or cooling fluid flowing through the clutch assembly travels through passages 172, 174 in the directions illustrated by arrows 176, thereby entering and exiting divider plate 140. Channel 170 directs fluid or oil radially within plate 140 (e.g., in the directions illustrated by arrows 138), thereby increasing the circulation of fluid/oil within plate 140 and the overall convective area of member 142, 144.

Figure 12:
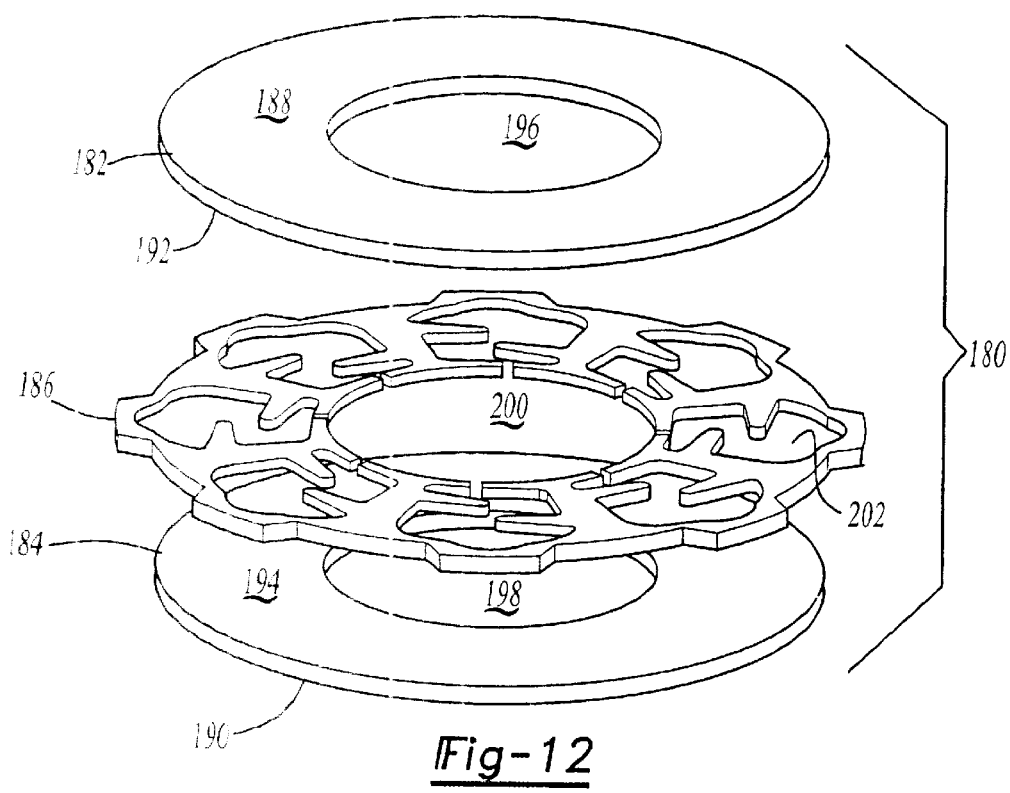
FIG. 12 is an exploded view of a clutch divider plate which is made in accordance with the teachings of a sixth embodiment of the invention.
Figure 13:
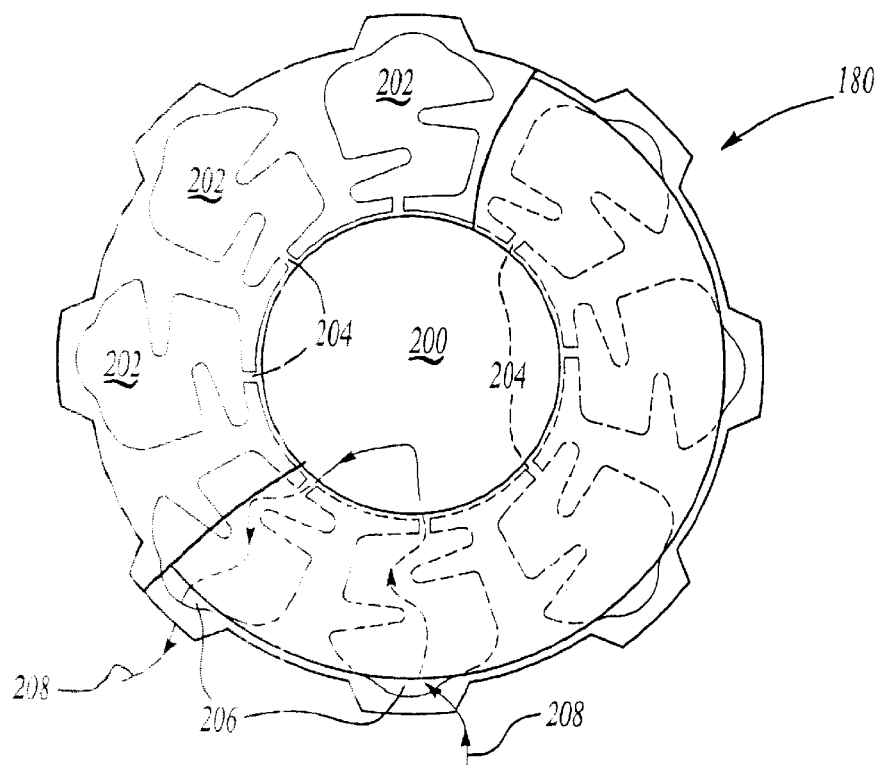
FIG. 13 is a front assembled view of the clutch divider plate shown in FIG. 11 with a portion of the front plate removed.

Referring now to FIGS. 12 and 13, there is shown a divider plate, member or assembly 180 which is made in accordance with the teachings of a sixth embodiment of the invention. Divider plate 180 includes a pair of substantially identical outer plates or members 182, 184, and a middle plate or member 186.

Members 182, 184 are generally ring-shaped and respectively include a pair of relatively smooth outer surfaces 188, 190 which are operatively engaged by friction plates 34, 36, and a pair of relatively smooth inner surfaces 192, 194. Members 182, 184 respectively include centrally disposed apertures 196, 198 which are substantially aligned or overlapping.

Member 186 is generally circular and includes a centrally disposed aperture 200 which is, substantially aligned with apertures 196, 198. Member 186 further includes several substantially identical and generally "S"-shaped openings or apertures 202. Each aperture 202 includes a channel 204 which communicates with centrally disposed aperture 200, and an outer recess or port 206 which communicates with the exterior plate 180, thereby allowing for the passage of oil and/or fluid into and out of divider plate 180. In the preferred embodiment of the invention, member 186 is stamped, punched or otherwise machined from a conventional metal material.

Members 182, 184, and 186 are fixedly coupled together in a conventional manner, such as by laser welding, brazing, bonding, sinter-brazing, stamping or staking. When members 182, 184 and 186 are joined together, the"S"-shaped apertures or openings 202 of member 186 provide passages for cooling fluid or oil to pass into and out of divider plate 180.

In operation, transmission oil and/or cooling fluid flowing through the clutch assembly passes into and out of ports 106 and channels 204 in the directions illustrated by arrows 208, thereby penetrating and traversing divider plate 180. Members 182–186 cooperate to provide a substantially increased the "convective area" relative to prior divider plates, and therefore offers improved heat dissipating attributes or benefits. Additionally, the "S"-shaped apertures or passages 202 assist in generating fluid turbulence within the plate 180, thereby increasing heat dissipation and convection.

It is to be understood that the invent on is not to be limited to the exact construction and/or method which hag been illustrated and discussed above, but that various changes and/or modifications may be made without departing from the spirit and the scope of the invention.

What is claimed is:

1. A divider plate for use within a clutch assembly of the type having a first and second friction plate, and a cooling fluid, said divider plate comprising:

a first portion which is selectively engaged by said first friction plate;

a second portion which is selectively engaged by said second friction plate; and a third portion which is disposed between said first portion and said second portion, said third portion having a plurality of "S"-shaped apertures which form at least one passage for receiving at least a portion of said cooling fluid, thereby cooling said divider plate, said "S"-shaped apertures being effective to produce turbulence within said received cooling fluid.

2. A divider plate which assists in the transfer of torque within a clutch assembly wherein said clutch assembly includes a first and second friction plate and wherein said divider plate is at least partially cooled by a fluid, said divider plate comprising:

a first generally ring shaped plate having an first outer surface which is designed to be selectively contacted by said first friction plate;

a second generally ring shaped plate having a second outer surface which is designed to be selectively contacted by said second friction plate;

an inner ring and an outer ring which are disposed between said first and said second generally ring shaped plates, and which each include a plurality of notches which cooperatively form at least one passage for receiving said fluid, thereby cooling said divider plate.

3. The divider plate of claim 2 wherein said plurality of notches of said inner ring are radially offset from said plurality of notches of said outer ring.

4. A method for forming a divider plate for a clutch assembly having first and second friction plates, comprising the steps of:

providing a first member having a first surface which is adapted to be selectively engaged by said first friction plate, and a second surface;

providing a second member having a third surface which is adapted to be selectively engaged by said second friction plate, and a fourth surface;

forming at least one annular ribbed portion on said second surface;

forming at least one annular ribbed portion on said fourth surface; and coupling said second surface to said fourth surface, effective to form said divider plate and to create a cooling passage within said divider plate.

\* \* \* \* \*